United States Patent
Kudrolli et al.

(10) Patent No.: US 9,961,339 B2
(45) Date of Patent: May 1, 2018

(54) CALIBRATION RIG AND CALIBRATION METHOD FOR DUAL-HEAD GAMMA CAMERA

(71) Applicant: GAMMA MEDICA, INC., Salem, NH (US)

(72) Inventors: Haris Kudrolli, Derry, NH (US); Timothy R. Garcia, Woburn, MA (US); Aleksandr Kivenson, Windham, NH (US)

(73) Assignee: CMR Naviscan Corporation, Carlsbad, CA (US)

( * ) Notice: Subject to any disclaimer, the term of this patent is extended or adjusted under 35 U.S.C. 154(b) by 0 days. days.

(21) Appl. No.: 15/155,297

(22) Filed: May 16, 2016

(65) Prior Publication Data

US 2016/0360194 A1    Dec. 8, 2016

Related U.S. Application Data

(60) Provisional application No. 62/170,955, filed on Jun. 4, 2015.

(51) Int. Cl.
*H04N 17/00* (2006.01)
*H04N 5/225* (2006.01)

(52) U.S. Cl.
CPC ......... *H04N 17/002* (2013.01); *H04N 5/2251* (2013.01)

(58) Field of Classification Search
CPC .......... G21G 4/08; G01T 1/644; A61B 6/037; H04N 17/002; H04N 5/2251
See application file for complete search history.

(56) References Cited

U.S. PATENT DOCUMENTS

| | | | | |
|---|---|---|---|---|
| 9,504,431 B2* | 11/2016 | Bhattacharya | ......... | A61B 6/037 |
| 2005/0001170 A1* | 1/2005 | Juni | ...... | G01T 1/1644 250/363.04 |
| 2006/0284065 A1* | 12/2006 | Kasper | ...... | A61B 6/00 250/252.1 |
| 2013/0075599 A1* | 3/2013 | Allberg | ...... | G21G 4/08 250/252.1 |

* cited by examiner

*Primary Examiner* — David Porta
*Assistant Examiner* — Faye Boosalis
(74) *Attorney, Agent, or Firm* — McLane, Middleton, Professional Association

(57) ABSTRACT

A calibration rig and calibration method for an imaging system includes a base and a holder extending from the base, the holder including a fixture configured to hold a radioactive source material in a two-dimensional geometric configuration and a radioactive source material disposed in the fixture.

28 Claims, 7 Drawing Sheets

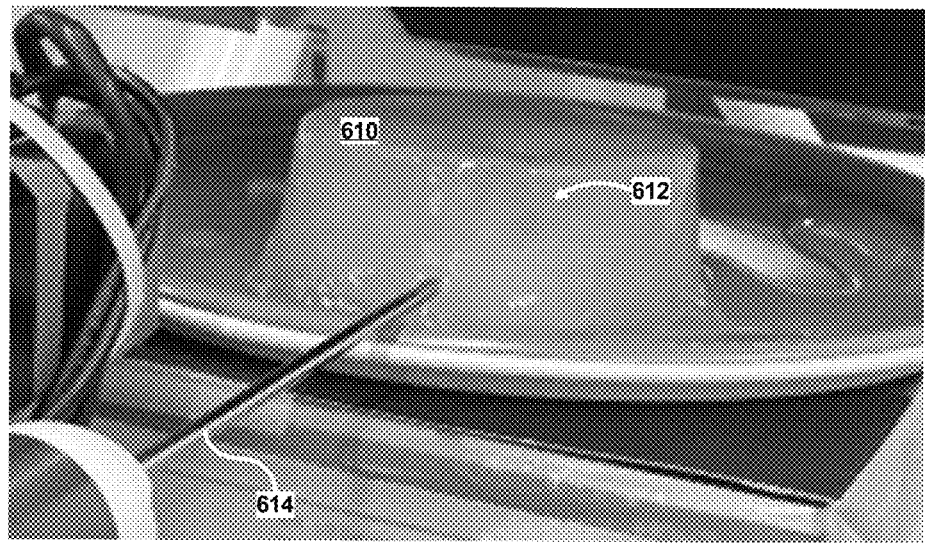
FIG. 8
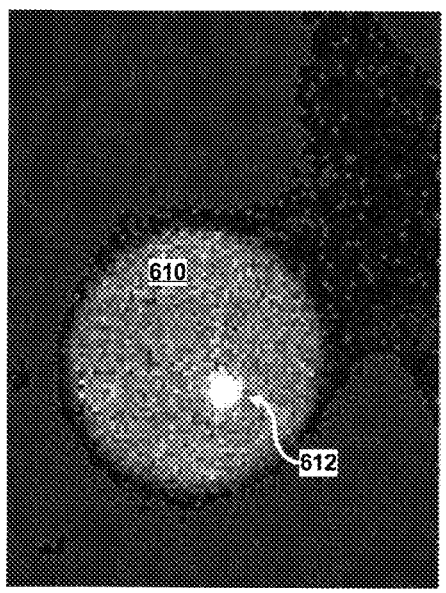 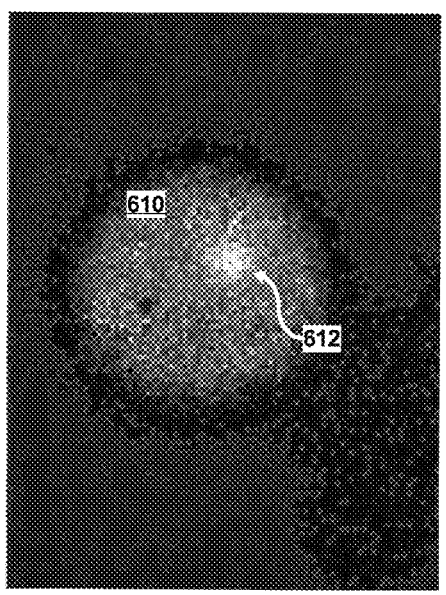
FIG. 9A          FIG. 9B

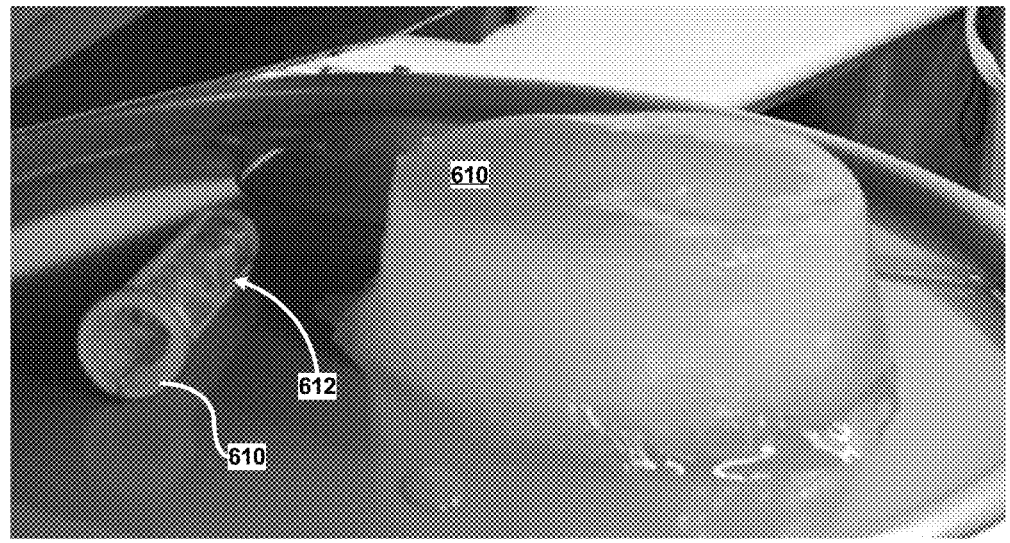
FIG. 10
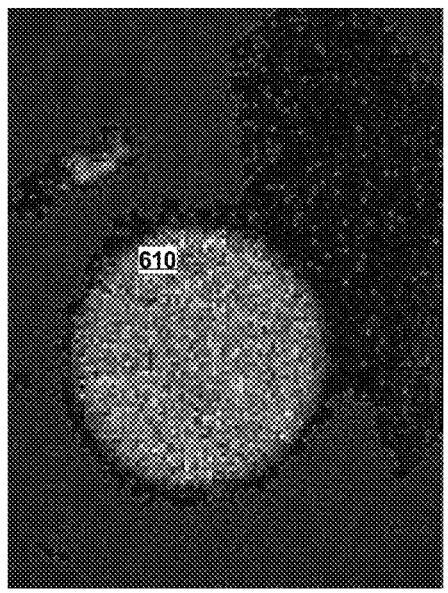 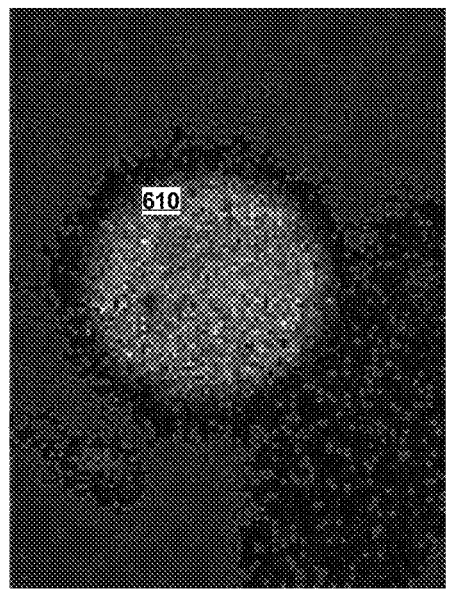
FIG. 11A         FIG. 11B

CALIBRATION RIG AND CALIBRATION METHOD FOR DUAL-HEAD GAMMA CAMERA

CROSS REFERENCE TO RELATED APPLICATION

This application claims the priority benefit of U.S. provisional application No. 62/170,955 filed Jun. 4, 2015. The aforementioned provisional application is incorporated herein by reference in its entirety.

BACKGROUND

Non-invasive molecular imaging can be performed using techniques such as single photon emission (SPE) planar imaging, single photon emission computed tomography (SPECT), positron emission tomography (PET), or Molecular Breast Imaging (MBI). Such non-invasive imaging techniques can be used for applications such as localization of cancerous lesions; guiding a surgical intervention, such as insertion of a biopsy needle or a device for surgical excision or ablation; insertion of a radioactive seed (brachytherapy), drug, stem cells or other therapeutic agent; or insertion of a guide wire or marker.

Such non-invasive imaging techniques involve the injection of a radionuclide pharmaceutical source that preferentially binds to selected tissues in the body. Radiation emitted from the source can be detected by one or more detectors. For example, Technetium Tc99m-Sestamibi (or Tc99m-Tetrofosmin) is able to bind preferentially to breast tumor cells. Tc99m-Sestamibi emits gamma radiation that can be detected by appropriate gamma radiation detectors. Cameras have been developed that employ gamma photon detectors, including solid-state cadmium zinc telluride (CZT) detectors and others.

SUMMARY

The usefulness of a dual-head camera system for imaging lesions for cancer detection can be increased by adding the ability to locate suspected lesions in three-dimensional space for biopsy guidance. This is possible when the view directions of the two cameras are not parallel, as when one camera is at a non-parallel angle to the other camera or when slant hole collimators are used, and when the precise position in space of one camera relative to the other camera is known.

The present invention relates to a calibration rig for a dual-head imaging system that allows for the precise position of one camera relative to the other to be determined quickly and easily.

The calibration rig includes a holder that holds a radioactive line source in a particular geometric configuration. The calibration rig is placed in the fields of view of the two cameras and images of the line source are obtained by each camera. The position of each camera relative to the calibration rig is calculated based on the relationship between the apparent shape of the line source in an image from each camera and the true shape of the line source held by the rig. The position of one camera relative to the other camera can then be calculated from the positions of each camera relative to the calibration rig.

The calibration rig in accordance with the present disclosure is low cost and portable, so that pairs of cameras can be calibrated in the field as needed.

BRIEF DESCRIPTION OF THE DRAWINGS

The invention will be more fully understood from the following detailed description taken in conjunction with the accompanying drawings in which:

FIG. 8 is a photograph of a gel phantom with a red spot in the center where the simulated lesion was located;

FIGS. 9A and 9B are images of the phantom from the top and bottom cameras showing the simulated lesion standing out among the background activity;

FIG. 10 is a photograph of the phantom after the simulated lesion was removed with a biopsy needle; and FIGS. 11A and 11B are images from the top and bottom cameras wherein the simulated lesion is no longer visible.

DETAILED DESCRIPTION OF THE PREFERRED EMBODIMENTS

Figure 1:
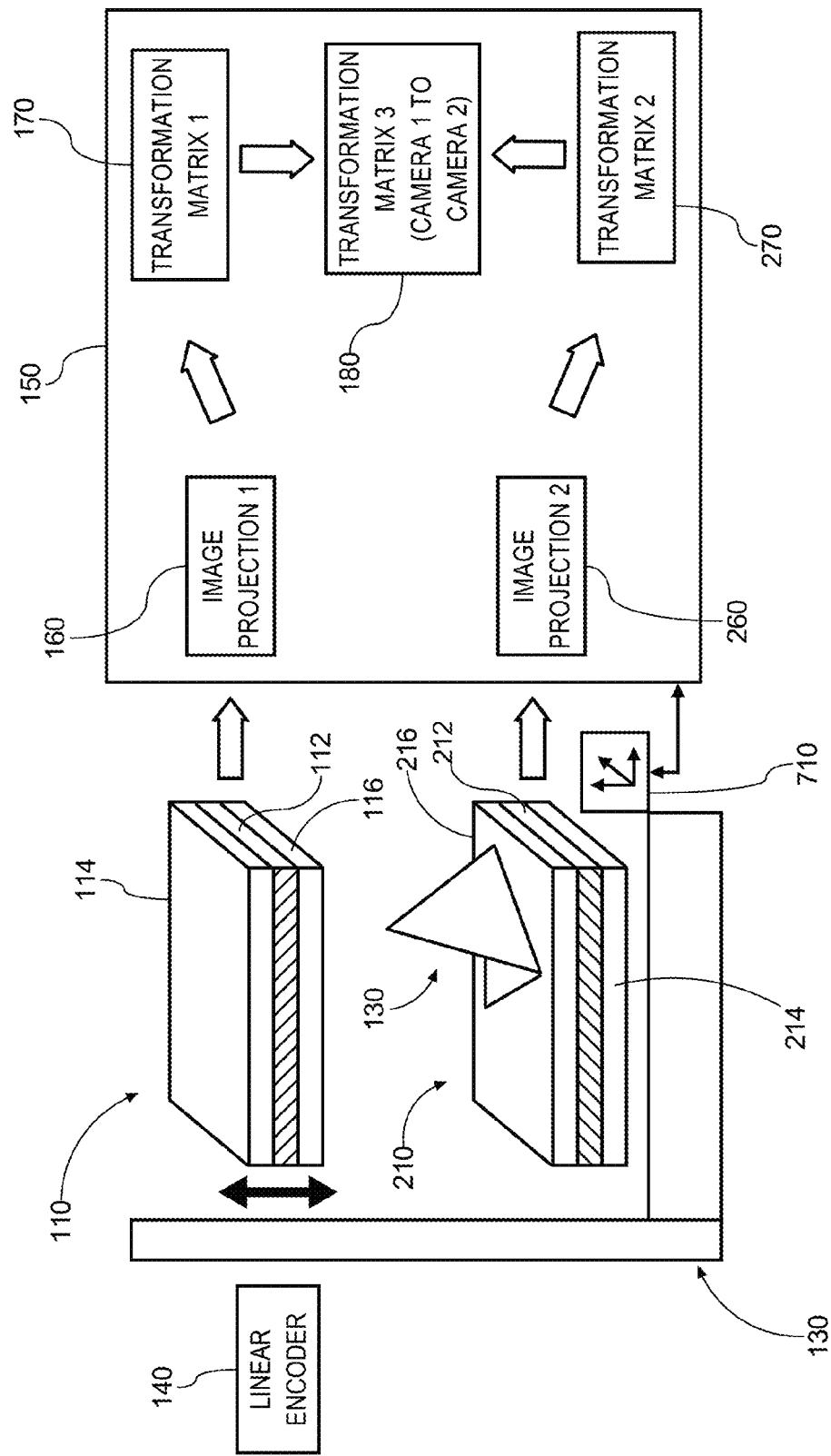
FIG. 1 is a schematic illustration of a molecular imaging system in accordance with one embodiment.
Figure 2:
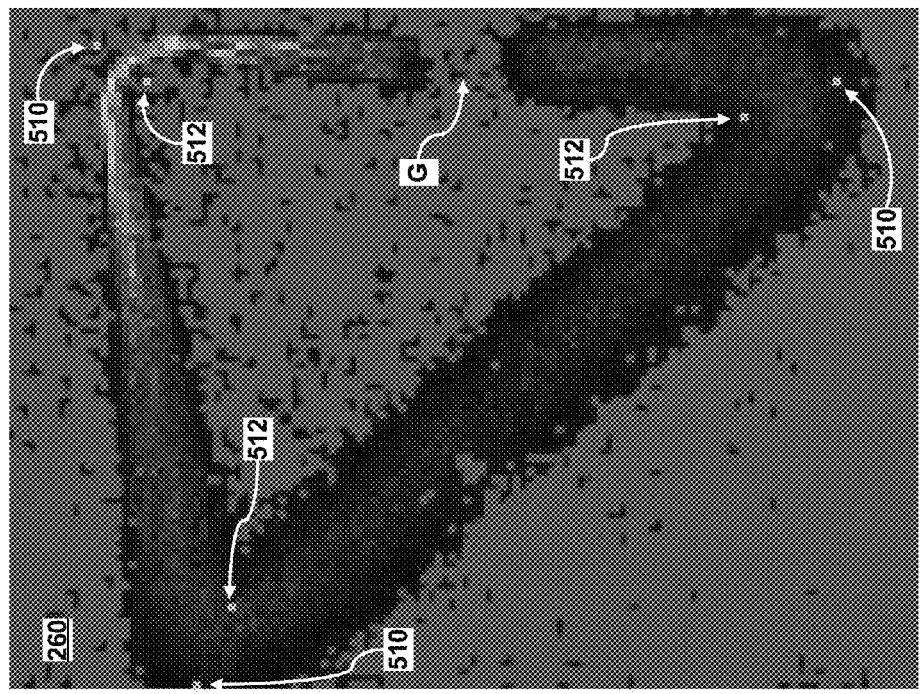
FIG. 2 is an exemplary image projection from a first gamma camera in a molecular imaging system.
Figure 3:
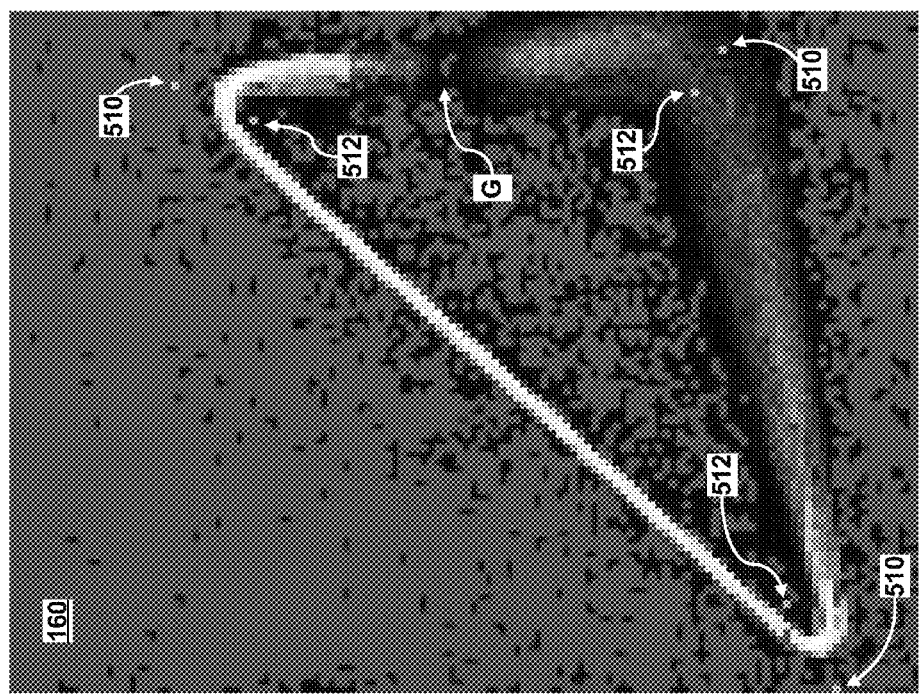
FIG. 3 is an exemplary image projection from a second gamma camera in a molecular imaging system.
Figure 4:
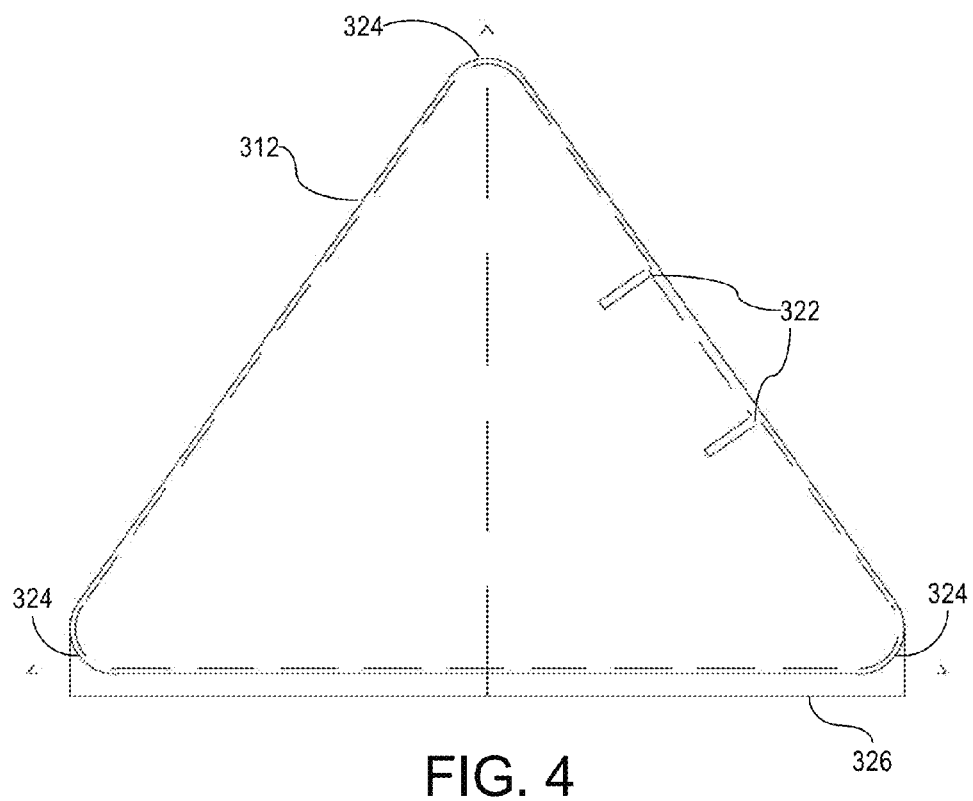
FIG. 4 is a plan view of an exemplary calibration rig support holder.
Figure 5:
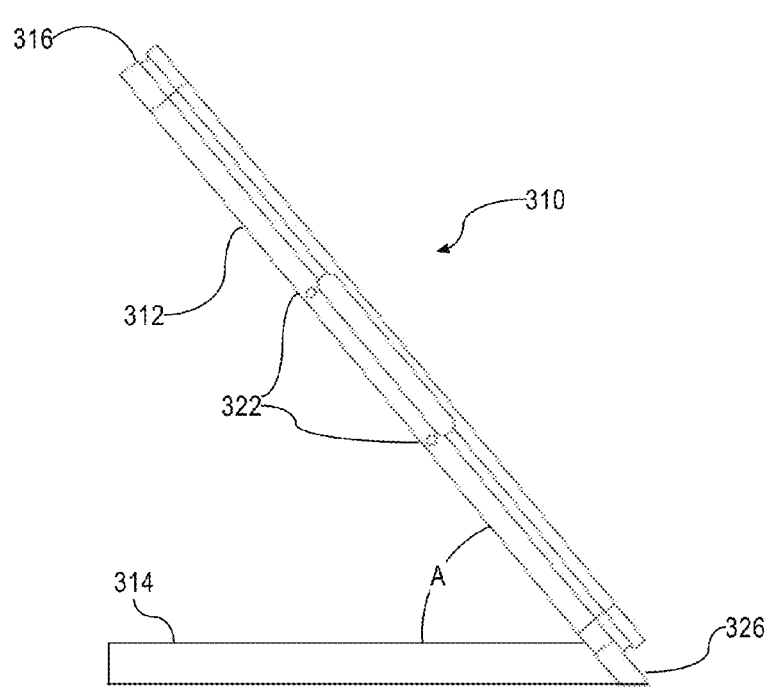
FIG. 5 is a side view of the calibration rig support holder appearing in FIG. 4 with an attached base.

Referring to FIGS. 1-5, an exemplary embodiment of a molecular imaging system, designated generally as 100, is illustrated. The imaging system 100 is particularly adapted for molecular breast imaging (MBI) applications, although it can also be adapted and used for other nuclear medicine applications. The molecular imaging system 100 includes a first radiation detecting camera 110 and a second radiation detecting camera 210, which may be mounted on a suitable support or frame 130. The cameras 110, 210 detect radiation, which is typically gamma radiation emitted from a radionuclide pharmaceutical source that has been injected into a patient. The imaging system 100 can include shielding to prevent leakage of radioactivity, as would be known in the art. Although the exemplary embodiment is shown and described by way of reference to a dual head imaging system wherein the camera heads are parallel, it will be recognized that the present invention cold also be adapted for use in connection with a dual-head system wherein one camera head is rotated with respect to the other camera head.

The cameras 110, 210 can be mounted on the support frame 130 to allow one or both of the cameras to be moved as needed to a position suitable for a particular patient or body part being imaged. In certain embodiments, the second camera 210 is stationary and the first camera 110 is movable up and down in the vertical direction toward and away from the second camera 210.

The first camera 110 includes a first detector 114 comprising a photon-sensitive material and associated processing electronics. A first collimator 112 is attached to the detector 114. The second camera 210 is in opposing, spaced apart relation to the first camera 110 and includes a second photon-sensitive detector 214 and a second collimator 212 attached to the detector 214.

In certain embodiments, such as for MBI applications, each camera 110, 210 includes an optional compression plate 116, 216 overlying the respective collimator 112, 212, so that breast tissue can be compressed between the two cameras. One of the cameras, for example, the first camera 110 in the embodiment shown, can be mounted for linear movement toward and away (i.e., vertically in the orientation shown in FIG. 1) from the other camera. A linear encoder 140 can be provided to control and/or measure movement of the first camera 110 for this purpose.

The cameras 110, 210 are in communication with an image acquisition system 150 that controls operation of the cameras 110 and 210. The image acquisition system 150 includes, processing electronics and associated memory for receiving, processing, storing, and/or displaying image data acquired by the cameras 110, 210. The processing electronics may include control logic, which may be implemented in hardware, software, firmware, or combinations thereof.

Each camera 110, 210 includes a pixelated radiation detector 114, 214 and a collimator 112, 212, which is a plate with a grid of elongated passageways to limit the photons that reach the detector to those having an incidence angle within a narrow range. The openings in the collimator are in alignment with the pixels on the detector. For example, each hole of the collimator can be aligned with one, four, or nine pixels of the detector. In certain embodiments, e.g., for applications such as MBI, the cameras are arranged so that the detectors are parallel to each other during imaging. The holes of the two collimators are angled with respect to each other so that 3D position information can be obtained from the 2D projection images captured by the two cameras, as described further below.

The cameras can employ any suitable detector. In certain embodiments, a pixelated semiconductor-based radiation detector, such as a cadmium zinc telluride (CZT) detector, is used. A CZT detector is advantageous in that it can be operated at room temperature and it offers superior spectral resolution and intrinsic spatial resolution compared to conventional scintillator based detectors.

Other types of detectors are also contemplated. For example, scintillation-based detectors, such as a flat crystal plane for converting gamma rays to visible light and an associated array of photomultiplier tubes or other means for converting the visible light to electrical pulses, can be used. In certain embodiments, a crystal of sodium iodide with thallium doping can be used.

The principle of operation of the two cameras 110, 210 can be described as follows. Imagine a radioactive point source somewhere between the two gamma cameras. If the position and orientation of each camera is known, then the position of that point source in 3D space can be calculated from its apparent position on each camera by extending a line parallel to the orientation of the camera from the point on that camera that corresponds to the apparent position of the source. The intersection of these lines indicates the position of the point source in 3D space.

One major exception to this general approach arises when the two cameras look directly at each other. In that case, the lines from the point source to each camera are parallel, intersecting along their entire length and not indicating a unique 3D position. This situation can be avoided by tilting one camera relative to the other or by slanting the openings in each collimator so that the two cameras are no longer looking directly at each other. The use of slant hole collimators is advantageous for MBI applications in that the cameras can be mounted such that the surfaces are parallel to each other. Although the illustrated embodiment depicts gamma cameras having parallel surfaces, it will be recognized that the present development can also be implemented in gamma camera systems wherein one camera is angled with respect to the other camera.

The holes of the collimators localize the gamma radiation from the source in the patient onto the pixels of the detector. The length and width (or diameter) of the holes, the depth of the holes, and the width of the septa that separate the holes affect resolution and sensitivity of the gamma camera. Collimators are typically formed of materials such as lead, aluminum, tungsten, tantalum, or gold that can minimize cross talk between pixels.

A suitable collimator for the camera system is a registered square-hole design, which allows the openings in the collimator to have the same shape and spacing as the pixels on detector. In certain embodiments, each collimator opening corresponds to one pixel.

The collimator parameters that remain adjustable are septal height (the distance from the top to the bottom of the collimator), septal width (the thickness of the walls between holes), and slant (the angle of the holes from the vertical). These parameters can be chosen to maximize sensitivity while keeping resolution, septal penetration, and 3D localization accuracy within reasonable limits.

In one embodiment, the collimator was designed with goals of a resolution no worse than 5.4 mm at 30 mm from the top of the collimator and septal width no less than 0.25 mm to reduce fragility.

The resolution of a collimator only depends on its height, not on the slant of the openings and the standard formula for resolution indicates that a height of 10.0 mm is advantageous. The "Chicago Septal Penetration Criterion" indicates that fairly thick septa are required for collimators with these parameters, but simulations of septal penetration show this to be over-conservative. In the simulations, septa even thinner than 0.25 mm performed well, so a collimator having 0.25 mm thick septa is sufficient.

The remaining free parameter is the collimator slant angle. Increasing the slant angle (up to 45°) leads to increased accuracy for 3D localization calculations, at the cost of reduced sensitivity and certain undesirable septal penetration artifacts. Calculations indicate that a slant angle of about 15° is sufficient for reasonable 3D positioning accuracy while retaining high sensitivity and minimal septal penetration. Collimators with this slant should perform well for both 3D localization and standard 2D imaging applications.

As the collimator angle relative to the CZT increases, the gamma rays punch through to the next CZT pixel and degrade spatial resolution. Therefore, the slant angles of the collimators are advantageously minimized.

A summary of exemplary parameters for the slant-hole collimator operable to be employed in the gamma cameras of the present disclosure is given in Table 1.

TABLE 1

| Parameter | Value |
| --- | --- |
| height | 10.0 mm |
| septal thickness | 0.25 mm |
| slant angle | 15° |
| resolution | 5.4 mm at 30 mm |
| sensitivity | 9.24E-4 |

In certain embodiments, both of the collimators 112, 212 are slant hole collimators. In certain embodiments, the slant angle of each collimator 112, 212, which may be the same or different, is in the range of 5-85 degrees. In certain more limited embodiments, the slant angle of each collimator 112, 212, which may be the same or different, is in the range of 5-45 degrees, e.g., 5, 10, 15, 20, 25, 30, 35, 40, or 45 degrees. In certain embodiments, the slant angle of the first collimator 112 is in one direction relative to vertical and the slant angle of the second collimator 212 is in a second direction relative to vertical opposite the first direction such that the relative angle between the first and second collimators 112, 212 is equal to the sum of the absolute value of the slant angles of the first and second collimators 112, 212 with respect to vertical.

In preferred embodiments, the first collimator 112 is a slant hole collimator having a slant angle of 15 degrees from vertical in one direction and the second collimator 212 is a slant hole collimator having a slant angle of 15 degrees from vertical in the opposite slant angle direction to provide a 30-degree relative difference between the slant angles of the collimators 112, 212.

It will be recognized that other configurations are possible. For example, in certain embodiments, the first collimator 112 is a slant hole collimator and the second collimator is a parallel hole (no slant angle) collimator. In certain other embodiments, the first collimator 112 is a parallel hole collimator and the second collimator is a slant hole collimator. In still other embodiments, both of the collimators 112, 212 are parallel hole collimators wherein at least one of the camera is rotatable with respect to the other camera.

The collimators can be manufactured in any suitable manner, such as by additive manufacturing process or by wire electrical discharge machining (EDM) processes. Each collimator grid can be coupled to its associated camera using a collimator frame. In order to shield the detectors from scattered radiation, the frame or certain parts of these frames can be made of copper tungsten alloy or other suitable radiation-blocking material.

The slant hole collimators 112, 212 and the two detectors 114, 214 can provide enough information to calculate the 3D position of a radioactive source, such as a radionuclide tracer bound to a cancerous lesion, that is visible to both cameras. This calculation, however, requires knowledge of the position and orientation of each camera. Accordingly, this knowledge is obtained by placing a calibration rig 310 containing a radioactive source material 312 between both cameras to obtain images of the radioactive material by both cameras, described further below. Once the system is calibrated, the 3D position of a lesion in the field of view of both cameras can be determined.

The calibration rig 310 includes a holder 312 having a known geometric configuration. The holder 312 may be have a solid plate like construction or may have a frame like construction bounding a central opening. In preferred embodiments, the holder 312 defines an equilateral triangle, although other geometric configurations could also be used. The holder 312 is attached to a base 314. The base is configured to rest on the upper surface of second camera 210 and support the holder at an angle A relative to the planar surface of the camera 210. In preferred embodiments, the angle (A) is 45 degrees, although other angles are contemplated. The base and holder components may advantageously be formed of a material that is generally transparent to the radiation being imaged, e.g., gamma rays.

Figure 6:
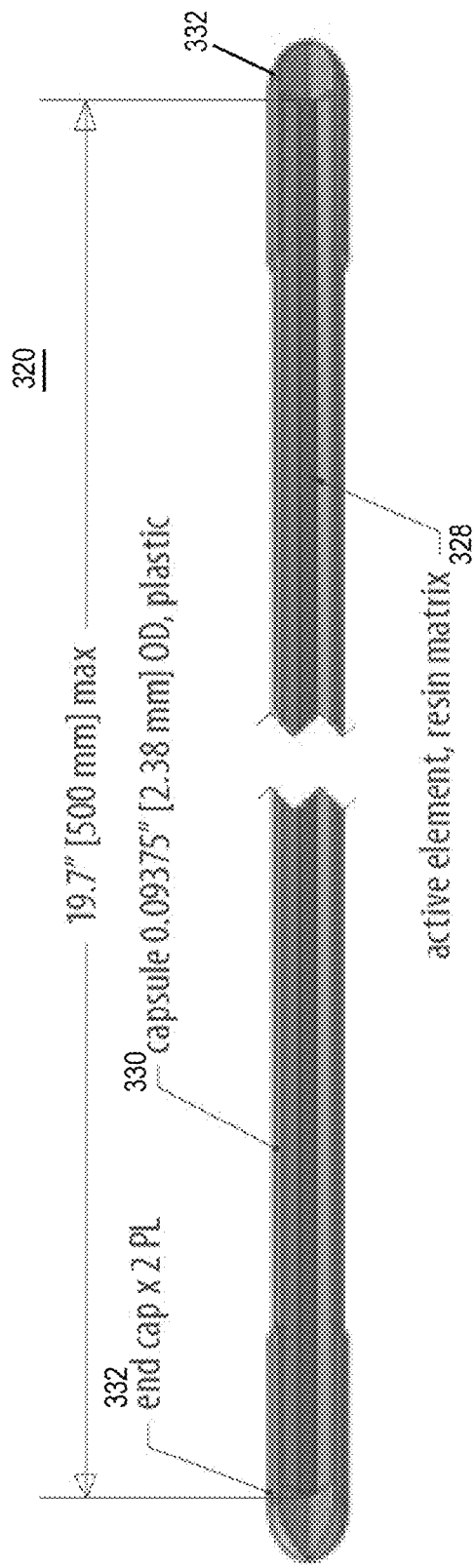
FIG. 6 depicts an exemplary radioactive line source useable with the present calibration rig.

The holder 312 includes a groove or channel 316 extending around the peripheral edge which receives a flexible radioactive line source 320 (see FIG. 6). The line source 320 in accordance with the illustrated embodiment includes an inner tube 328 comprising a radioactive element embedded within a resin matrix received within an outer capsule 330. End caps 332 are disposed over each end of the line source.

Openings 322 may be provided in the holder 312 for receiving fasteners such as clamps, clips, threaded fasteners, etc. for securing the ends of the radioactive line source 320. In preferred embodiments, the holder 312 is sized to hold the line source under tension to secure such that the sides of the line source form generally straight lines. In the illustrated preferred embodiment, the corners 324 of the holder 312 are rounded to facilitate bending the line source around the corners.

In certain embodiments, the holder 312 comprises a plate having a triangular configuration with three straight edges having a groove 316 disposed along each of the three edges in a triangular configuration. The radioactive source material can be a radionuclide disposed in a flexible and preferably stretchable plastic tube that can be fitted to the holder of the calibration rig. For example, the radioactive source material is placed within the groove, which thereby retains the source material in the triangular configuration. The radioactive source material can be retained within the groove in any suitable manner, such as by a friction fit, a lip, adhesive, or the like. The corners of the groove in the triangular configuration can be rounded to ease the fit of the line source around the corners. The grooves hold the radioactive source material taut in its tube so that it forms three straight lines.

The base 314 can comprise a further plate disposed at an angle to the plate forming the holder that retains the line source. In certain embodiments, the holder 312 includes an extending lip 326 along one edge. The base 314 is affixed to the holder 312, for example, with a suitable adhesive.

The holder extends from the base at a suitable angle. In certain embodiments, the angle is 45 degrees, although other angles are contemplated. When the base 314 is placed on the second camera 210, a 45-degree angle provides a good compromise between making the calibration rig 310 clearly visible in the camera images and increasing the sensitivity of the image-analysis algorithms (described further below) to changes in the angle between the calibration rig and the cameras. A rig sitting flat on the camera (in the case of a camera having a parallel hole collimator) or otherwise arranged so that the plane of the rig frame is orthogonal to the slant angle (in the case of a camera having a slant hole collimator) would be most clearly visible, its apparent shape would vary very little with small changes in the angle between the rig and the camera. Likewise, a rig positioned at 90 degrees to the camera (in the case of a camera having a parallel hole collimator) or otherwise arranged so that the plane of the rig frame is parallel to the slant angle (in the case of a camera having a slant hole collimator) would yield the most variation in apparent shape in response to changes in the angle between the rig and the camera; however, it would not be clearly visible because it would appear as a line rather than as a triangle.

It has been found that a rig which positions the holder at an angle A which is 45 degrees may advantageously be employed. It will be appreciated, however, that angles other than 45° can be used. In certain embodiments, the angle A is in the range of 20-70 degrees, such as 20°, 25°, 30°, 35°, 40°, 45°, 50°, 55°, 60°, 65°, or 70°.

The holder 312 and the base 314 are advantageously formed of a suitable plastic material that is effectively transparent to the radiation emitted by the radioactive source material.

Other geometric shapes for the calibration rig can be used, as long as the geometry of the shape is known. For example, shapes such as square, rectangular, or any other polygonal shape can be used. In certain embodiments, the shape may comprise a plurality of linear segments of known length and angular orientation. It will be recognized that the polygonal shapes or linear segmented configurations referenced herein are not intended to preclude minor deviations thereof For example, it will be recognized that the reference to a shape as being a polygon or a plurality of linear segments is not intended to preclude shapes having a radius of curvature between adjacent sides or segments, which facilitates bending the linear radiation source around the frame as described below. In certain embodiments, circular, oval, elliptical and other curved shapes can be used as the known geometric shape of the calibration rig. In certain embodiments, a combination of one or more linear segments and one or more curved segments can be used as the known geometric shape.

In certain embodiments, one or more asymmetries may be included in the shape, to assist in orientation of the image source by each camera. For example, in certain embodiments a gap G can be introduced into the line of the radionuclide, e.g., along one side of a triangle. In another example, one side of the triangle can have a different length from one or both of the other sides. In this manner, one or more sides of the calibration rig can be distinguished from the other sides. It will be recognized that the rig still has a "mirror symmetry," which cannot be eliminated for a 2D object, however, having an approximate a priori knowledge of the arrangement of the two cameras is sufficient to eliminate this ambiguity.

As noted above, the radioactive source material can be a radionuclide disposed in a flexible, preferably stretchable plastic tube that can be fitted to the holder of the calibration rig. The radionuclide can be dispersed in a suitable carrier, such as an epoxy matrix, for example, to enable injection into the plastic tube. In certain embodiments, the isotope Co-57 is a suitable radionuclide. One radioactive source material comprising Co-57 uniformly dispersed in an epoxy matrix is commercially available as Flexible Marker from Eckert & Ziegler as Flexible Marker FM-057-150U (SS&DR No. CA 0406S172X). In this product, the Co-57 and epoxy dispersion is provided in a flexible plastic tube having sealed ends (outer diameter 0.094 inch, inner diameter 0.03 inch, overall length 19.7 inch, active length 19.2 inch; activity 150 KO. The tube is also able to stretch, so that it can be placed into the groove 316 around the edges of the holder 312, as described above, to form generally straight lines. Other radionuclides can be used, such as Tc-99, I-123, and Ce-139.

The underlying principle of the presently disclosed calibration procedure is that the transformation of a camera relative to the calibration rig determines the apparent shape of the image of the calibration rig taken by that camera. Conversely, if the projection of the calibration rig is measured, the transformation of the camera relative to the rig can be calculated. In operation, the calibration rig of known geometry is placed between the first and second cameras and imaged by each camera. Data representative of the calibration rig image acquired by the first camera 110 is stored as a first projection 160, i.e., the projection of the calibration rig in three-dimensional space projected onto the two-dimensional surface of the detector. Data representative of the calibration rig image acquired by the second camera 210 is stored as a second projection 260.

The image acquisition system 150 measures the triangular shape visible in each of the first and second projections 160, 260. Exemplary image projection 160, 260 appear in FIGS. 2 and 3, wherein the light colored pixels 510, 512 represent the corners of the triangle based on statistical analysis of the acquired pixel values. The outer points 510 represent the corners of the hypothetical triangle, but since the actual rig has curved corners, these are extrapolated. There is also another inner set of points 512 corresponding to the centers of the circles inscribed in the curve of each actual corner.

For each projection image 160, 260, image acquisition system 150 calculates a 5-parameter transformation matrix 170, 270 that best relates the known shape of the calibration rig to the shape of its image. The calculation of the transformation matrices 170, 270 may be performed via a least squares fitting. Parameters may be introduced in one or more steps to prevent the least squares fit from failing to converge.

The third transformation matrix 180, i.e., the transformation matrix from the first camera 110 to the second camera 210 may then be calculated in a straightforward way from the transformation matrices 170, 270 from each camera to the calibration rig. Multiple images of the calibration rig can be used to improve the accuracy of this matrix. Once the camera-to-camera transformation matrix 180 is known, the 3D coordinates of a radioactive source, such as a suspected lesion marked with a radionuclide tracer in a subject or body part being imaged, that is visible to both cameras can also be calculated in a straightforward way.

In certain embodiments, the calibration procedure can be repeated at a plurality of different camera separations, e.g., two, three, or more camera separations by moving the first camera and repeating the calibration procedure and calculating the camera-to-camera transformation matrix for each new position and storing data representative of the transformation matrix in association with the camera separation as indicated by the positional encoder 140. The resulting fit can be interpolated to allow for linear movement of the first camera and to identify the 3D coordinates of an imaged lesion or other radiation source when the first camera is moved to an intermediate position as indicated by the linear encoder 140.

The centroid of the projection of a point source onto a camera is determined by the position and orientation of the camera relative to that point source. A generic object with position and orientation in 3D space has six degrees of freedom, but because the projection of the centroid does not depend on the distance from the point source to the camera along the vector parallel to the view direction of the camera, the camera effectively has only five degrees of freedom. In practice, this means that one translation parameter in the camera transformation matrix may be held constant, leaving two translation and three rotation parameters unknown. The goal of the calibration algorithm performed by the image acquisition system 150 is to determine the values of these five unknown parameters.

Figure 7:
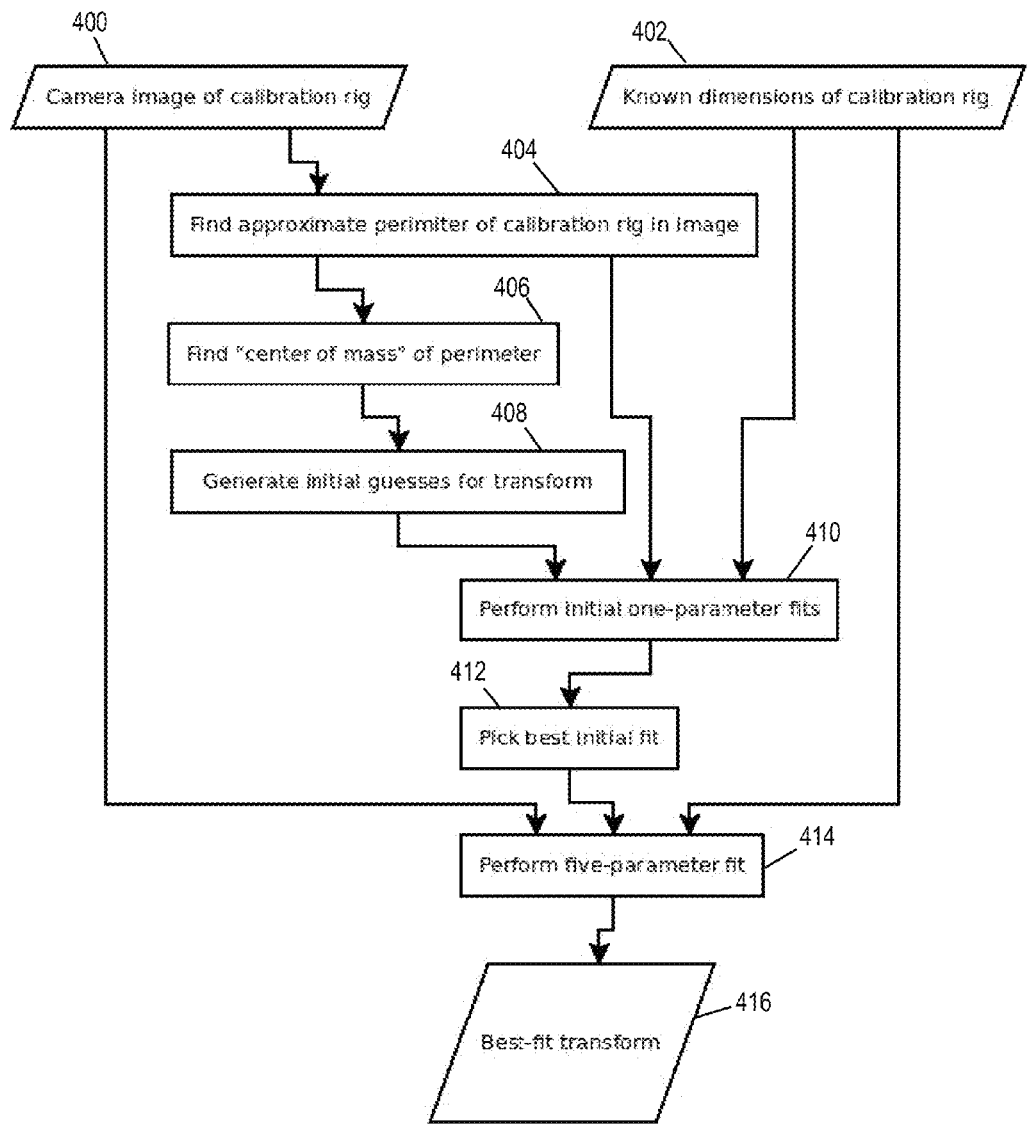
FIG. 7 is a flow chart outlining an exemplary calibration process of the present disclosure.

FIG. 7 illustrates a flow chart of an exemplary calibration process that relates the known dimensions of the calibration rig to the projection images 160, 260 of the rig. At step 400, a projection image (160) of the calibration rig is acquired and the pixel values are analyzed to determine the approximate perimeter of the calibration rig in the image (step 404) and the "center of mass" of the perimeter (step 406). At step 408, initial guesses at the transform are generated based on the center of mass found at step 406.

At step 410, the initial guesses generated at step 408 are used to perform initial one-parameter fits of the perimeter of the rig in the image 160 to the known dimensions of the calibration rig, e.g., which may be stored in a memory associated with the image acquisition system 150. The best initial fit based on the initial one-parameter fits is selected at step 412, a five-parameter fit is performed at step 414, and the best fit transform is determined at step 416.

These five parameters can be found by an iterative non-linear least-squares fit, such as the Levenberg-Marquardt algorithm, in which the error to be minimized is the distance between the position of each gamma ray detected by the camera and the closest point on the projection of the calibration rig as calculated from the transform of the known shape of the rig.

Successful convergence of a five-parameter fit cannot be taken for granted. Therefore, good initial values for the parameters should be supplied at step 408. Two of the rotation parameters can be estimated by assuming that the rig 310 is sitting on its base 314 exactly as designed, such that the line source holder extends at a pre-selected angle. For example, in the preferred embodiment wherein the angle A is 45 degrees, case one rotation parameter is 45 degrees and another rotation parameter is 0 degrees. Two translation parameters, e.g., along two orthogonal axes lying in the plane of the detector are estimated by finding the "center of mass" of the approximate perimeter of the calibration rig as seen in the camera image at step 406. The approximate perimeter (step 404) can be reliably determined by rotating a ray around the center of mass of the entire image and recording the brightest pixels along that ray. With these four parameters constrained, one-parameter fits to that approximate perimeter are performed from various starting values of the final remaining rotation parameter at step 410. The result of the best fit is kept (step 412). Thus, good initial values for all five parameters are found.

The five-parameter fit (step 414) then provides the best-fit values for all the parameters in the camera-to-calibration rig transformation. To improve the precision, this transformation can be calculated independently multiple times, with the calibration rig in a different position between the cameras each time, and with the results averaged together.

Once the two transformations 170, 270, from each camera to the rig, are found, the transformation 180 from one camera to the other is simply the first transformation matrix 170 multiplied by the inverse of the second transformation matrix 270. At this stage, the mirror symmetry can be corrected for; the cameras must be approximately parallel, so if the overall transform appears to show that they are not, then one camera's transform needs to be mirrored.

In the illustrated embodiment wherein one camera is allowed to move up and down, this calibration procedure needs to be repeated at multiple (e.g., two, three, or more) different camera separations, as quantified by the linear encoder 150. Then the moving camera 110 has seven degrees of freedom, rather than five; the additional two are the coefficients that relate the two free translational parameters to the value of the linear encoder. The overall process of fitting the parameters remains unchanged.

Referring now to FIGS. 8-11B, in a set of experiments, a phantom 610 was fabricated using agarose gel mixed with Tc-99m and water. A lesion was simulated with Tc-99m having activity concentration 40 times the background. A red dye was added to the simulated lesion to provide a visual indication of the lesion's location within the phantom. The phantom was biopsied using a biopsy needle 614 to remove the simulated lesion. FIG. 8 shows a photograph of the gel phantom 610 with a red spot 612 in the center where the simulated lesion was located. The images of the phantom from the top and bottom cameras 110, 210 appear in FIGS. 9A and 9B respectively and show the simulated lesion 612 standing out among the background activity. FIG. 10 shows the phantom 610 after the simulated lesion was removed with the biopsy needle 614. In FIG. 10, the red spot is no longer visible, whereas the capsule 616 next to the phantom can be seen to be filled with the red dye (612). The simulated lesion is no longer visible in the images from the top and bottom cameras appearing in FIGS. 11A and 11B.

For a biopsy procedure, a three-axis stage 710 (see FIG. 1) supporting the biopsy needle (614) can be mounted to the frame (130) adjacent to the bottom camera (210). The stage is also in communication with the image acquisition system (150) such that the biopsy needle can be controlled to position its tip at the location in three-dimensional space of an imaged lesion as calculated using the camera 1 to camera 2 transformation matrix (180) as determined in accordance with this disclosure.

The present calibration rig is advantageous because it allows for calibration of a dual-head imaging system without the need for a three-axis motorized stage and a high precision, costly radioactive point source. It also obviates the need to fabricate the camera mounting hardware with sufficient precision such that calibration after assembly is not necessary, which would be extremely costly.

The calibration rig eliminates the need to have a radioactive source present as a reference beacon during a procedure, such as a biopsy.

The calibration rig allows a lesion to be located in 3D space without sacrificing 2D imaging performance and allows a biopsy procedure to be performed by placing the tip of a biopsy needle accurately at the determined location of the lesion.

It will be appreciated that the various features of the embodiments described herein can be combined in a variety of ways. For example, a feature described in conjunction with certain embodiments may be included in another embodiment even if not explicitly described in conjunction with that embodiment.

The invention is not to be limited by what has been particularly shown and described, except as indicated by the appended claims.

What is claimed is:

1. A calibration rig for an imaging system comprising:
   a base;
   a holder extending from the base, the holder including a fixture configured to hold a radioactive source material in a two-dimensional geometric configuration; and
   the radioactive source material disposed in the fixture in the two-dimensional geometric configuration;
   wherein the holder further comprises a plate and the fixture comprises a channel disposed along the edges of the plate.

2. The calibration rig of claim 1, wherein the plate comprises a triangular shape having edges joined at corners, and wherein the channel is disposed continuously along the edges and extends around the corners.

3. The calibration rig of claim 1, wherein the radioactive source material comprises a source of gamma radiation.

4. The calibration rig of claim 1, wherein the radioactive source material comprises Co-57.

5. The calibration rig of claim 1, wherein the radioactive source material is selected from the group consisting of Co-57, Tc-99, I-123, and Ce-139.

6. The calibration rig of claim 1, wherein the radioactive source material is disposed in a tube, the tube including closed ends, and wherein the tube is disposed in the fixture.

7. The calibration rig of claim 6, wherein the tube comprises a flexible material.

8. The calibration rig of claim 1, wherein the radioactive source material extends continuously from a first end to a second end of the two-dimensional geometric configuration.

9. The calibration rig of claim 1, wherein the geometric configuration comprises a polygonal shape or a curvilinear shape.

10. The calibration rig of claim 1, wherein the base and the holder comprise a material that permits transmission of gamma radiation.

11. A calibration rig for an imaging system comprising:
a base;
a holder extending from the base, the holder including a fixture configured to hold a radioactive source material in a two-dimensional geometric configuration; and
the radioactive source material disposed in the fixture in the two-dimensional geometric configuration;
wherein the radioactive source material extends discontinuously from a first end to a second end of the two-dimensional geometric configuration.

12. The calibration rig of claim 11, wherein the radioactive source material comprises a plurality of radioactive point sources disposed at discrete locations along an extent of the two-dimensional geometric configuration.

13. A calibration rig for an imaging system comprising:
a base;
a holder extending from the base, the holder including a fixture configured to hold a radioactive source material in a two-dimensional geometric configuration; and
the radioactive source material disposed in the fixture in the two-dimensional geometric configuration;
wherein the geometric configuration comprises a triangle.

14. A calibration rig for an imaging system comprising:
a base;
a holder extending from the base, the holder including a fixture configured to hold a radioactive source material in a two-dimensional geometric configuration; and
the radioactive source material disposed in the fixture in the two-dimensional geometric configuration;
wherein the geometric configuration includes an asymmetry.

15. The calibration rig of claim 14, wherein the geometric configuration comprises a triangle and the asymmetry comprises a gap in one side of the triangle.

16. The calibration rig of claim 14, wherein the geometric configuration comprises a triangle and the asymmetry comprises one side of the triangle having a different length from another side of the triangle.

17. A molecular imaging system comprising:
a frame;
two cameras mounted on the frame, each camera comprising a radioactive source detector; and
a calibration rig disposable between the two cameras, the calibration rig comprising a base, a holder extending from the base, the holder including a fixture configured to hold a radioactive source material in a two-dimensional geometric configuration, and the radioactive source material disposed in the fixture in the two-dimensional geometric configuration;
wherein the cameras are mounted parallel to each other and each camera includes a pixelated detector and a collimator, the collimator comprising holes aligned with pixels on the camera, the holes of each collimator disposed at a non-parallel angle to the holes of the other collimator.

18. The system of claim 17, wherein the radioactive source detector of each camera comprises a gamma radiation detector.

19. The system of claim 18, wherein the radioactive source detector of each camera comprises a cadmium zinc telluride solid-state detector.

20. The system of claim 17, further comprising an image acquisition system in communication with the two cameras and operable to control operation of the cameras and to receive, process, store and display image data acquired by the cameras.

21. The system of claim 17, wherein the cameras are movable as a unit on the frame.

22. The system of claim 17, wherein at least one of the cameras is movable linearly toward and away from the other camera.

23. The molecular imaging system of claim 17, wherein the holder further comprises a plate and the fixture comprises a channel disposed in the plate.

24. The molecular imaging system of claim 23, wherein the channel is disposed along edges of the plate.

25. A molecular imaging system comprising:
a frame:
two cameras mounted on the frame, each camera comprising a radioactive source detector; and
a calibration rig disposable between the two cameras, the calibration rig comprising a base, a holder extending from the base, the holder including a fixture configured to hold a radioactive source material in a two-dimensional geometric configuration, and the radioactive source material disposed in the fixture in the two-dimensional geometric configuration;
wherein the cameras comprise breast-specific gamma cameras.

26. The system of claim 25 wherein the cameras are operable to detect gamma radiation emitted from technetium Tc-99m sestamibi.

27. The system of claim 25 further comprising a compression plate attached to each of the cameras.

28. The molecular imaging system of claim 25, wherein the holder further comprises a plate and the fixture comprises a channel disposed along edges of the plate.

* * * * *